United States Patent
Chaudhuri et al.

(10) Patent No.: US 12,321,247 B2
(45) Date of Patent: *Jun. 3, 2025

(54) MULTI-CORE PROCESSOR DEBUGGING SYSTEMS AND METHODS

(71) Applicant: T-Head (Shanghai) Semiconductor Co., Ltd., Shanghai Free Trade Area (CN)

(72) Inventors: Arjun Chaudhuri, Hangzhou (CN); Chunsheng Liu, Hangzhou (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 7 days.

This patent is subject to a terminal disclaimer.

(21) Appl. No.: 16/831,329

(22) Filed: Mar. 26, 2020

(65) Prior Publication Data

US 2024/0338288 A1 Oct. 10, 2024

(51) Int. Cl.
  *G06F 11/00* (2006.01)
  *G06F 11/22* (2006.01)

(52) U.S. Cl.
  CPC .............................. *G06F 11/2242* (2013.01)

(58) Field of Classification Search
  CPC .................................................. G06F 11/2242
  See application file for complete search history.

(56) References Cited

U.S. PATENT DOCUMENTS 6,523,157 B1  2/2003  Takahashi et al.
6,845,489 B1  1/2005  Mizuno et al.
(Continued)

FOREIGN PATENT DOCUMENTS

EP  3327573  5/2018
GB  201216269  9/2014

OTHER PUBLICATIONS

Bradley Quinton, "A Reconfigurable Post-Silicon Debug Infrastructure for Systems-on-Chip" 2008 (https://open.library.ubc.ca/cIRcle/collections/ubctheses/24/items/1.0065576). A Thesis Submitted in Partial Fulfillment of the Requirements for the Degree of Doctor of a Doctor of Philosophy, The University of British Columbia (Vancouver) Oct. 2008, Copyright Bradley Quinton, 2008 (p. i-vii, p. 7-9, p. 20-25, p. 34, p. 37-40, p. 43-49, pp. 54-59).

*Primary Examiner* — Jason B Bryan

(57) ABSTRACT

The present invention facilitates efficient and effective information storage device operations. In one embodiment, a system comprises: a plurality of processing cores configured to process information and a debug system coupled to the plurality of cores. The plurality of processing cores are configured to perform respective test operations on the respective processing cores. The debug system is configured to gather results of the test operations on a flexible compaction basis, wherein a compacted indication of a passing test result is available at a debug cluster basis and compacted indications of a failed test result available at the debug cluster basis are further resolved to identify a failing processing core within the cluster. The processing cores are organized in clusters, wherein a set comprising more than one of the plurality of processing cores and less than all of the processing cores is considered a cluster. The processing cores can be organized in levels, wherein the number of processing cores in a cluster differs at different level. The different levels correspond to a debug hierarchy.

21 Claims, 15 Drawing Sheets

(56) References Cited

U.S. PATENT DOCUMENTS

| | | |
|---|---|---|
| 7,058,869 B2 | 6/2006 | Adbel-Hafez et al. |
| 7,080,283 B1 | 7/2006 | Songer |
| 7,480,825 B2 | 1/2009 | Vorbach |
| 7,577,874 B2 | 8/2009 | Jones et al. |
| 7,657,791 B2 | 2/2010 | Codrescu et al. |
| 7,818,644 B2 | 10/2010 | Rajski et al. |
| 8,533,530 B2 | 9/2013 | Codrescu et al. |
| 8,566,645 B2 | 10/2013 | Rentschler et al. |
| 9,286,180 B1 | 3/2016 | Musunuri et al. |
| 9,372,768 B2 | 6/2016 | Conner et al. |
| 9,404,969 B1* | 8/2016 | Keller ............... G06F 11/277 |
| 9,852,038 B2 | 12/2017 | Kang et al. |
| 10,102,050 B2 | 10/2018 | Kris et al. |
| 10,331,506 B1* | 6/2019 | Chickermane .......... G06F 11/30 |
| 10,489,271 B2 | 11/2019 | Takabatake et al. |
| 2005/0193254 A1 | 9/2005 | Yee |
| 2005/0273490 A1 | 12/2005 | Shrivastava et al. |
| 2007/0283202 A1 | 12/2007 | Cheng et al. |
| 2009/0083599 A1* | 3/2009 | Kim ............... G01R 31/318547 |
| | | 716/132 |
| 2011/0307741 A1 | 12/2011 | Chen et al. |
| 2012/0210103 A1 | 8/2012 | Liao et al. |
| 2013/0159771 A1 | 6/2013 | Patel et al. |
| 2015/0082092 A1 | 3/2015 | Sarangi et al. |

* cited by examiner

751 Associating respective ones of the plurality of processing cores with a respective priority code.

752 Encoding the fault indication with the respective priority code associated with the failing processing core.

753 Identifying, based on the respective priority code and the fault indication, a respective one of the plurality of processing cores associated with a fault.

771 Gathering test results on a two dimensional basis corresponding to a debug cluster array configuration.

772 Performing a scan out operation to output the results.

773 identifying failing processing core based upon a failing indication in the results from the debug flip flop components.

FIG. 7C

MULTI-CORE PROCESSOR DEBUGGING SYSTEMS AND METHODS

FIELD OF THE INVENTION

The present invention relates to the field of testing and debugging information processing components.

BACKGROUND OF THE INVENTION

Numerous electronic technologies such as digital computers, calculators, audio devices, video equipment, and telephone systems facilitate increased productivity and cost reduction in analyzing and communicating data and information in most areas of business, science, education, and entertainment. Electronic components can be used in a number of important applications (e.g., medical procedures, vehicle aided operation, financial applications, etc.) and it is important for the electronic components to perform properly and accurately. Frequently, these activities involve processing large amounts of information rapidly and the processing components can be very complex and complicated. As the size and complexity of a processing chip (e.g., CPU, specialized processing chip, multi-core neural network processor, etc.) increases the testing and debug operations traditionally involve significant costs.

Multi-core processing chips often include multiple modules or processing cores. The modules or processing cores can be identical (e.g., artificial intelligence processing cores, neural network processing cores, etc.). Traditional chip hardware test approaches for multi-core processing chips are often problematic, expensive, and time consuming. For example, conventional automated test pattern generation (ATPG) run time and test time can involve significant costs and consumption of resources (e.g. resources to generate large test patterns, hours of run time, large memory, significant labor, etc,). In one embodiment, test time is the time for applying all test patterns to a device under test (DUT) from a tester. Given the large number of cores that can be included in a chip, traditional testing approaches usually involve significant resources and time being committed to communicating large amounts of test result data from the chip to exterior test equipment while incurring substantial cost. In addition, traditional test procedures typically only indicate if a circuit under test (CUT) has a fault (e.g., an erroneous or unexpected result, etc.) or does not have a fault. Extra efforts are usually required to provide adequate debug capabilities (e.g., to identify which part of a DUT is faulty, identify a specific core that is faulty, etc.).

SUMMARY

The present invention facilitates efficient and effective testing and debugging of faulty cores in a multi-core system. In one embodiment, a system comprises: a plurality of processing cores configured to process information, a test result compaction component, and a non-intuitive debug component coupled to the test result compaction component. In one exemplary implementation, the processing cores can be identical. The plurality of processing cores are configured to perform respective test operations within respective ones of the plurality of processing cores. The processing cores can be organized in a hierarchy of debug clusters. The test result compaction component can be configured to compact results of the respective test operations from a portion of the plurality of processing cores on a flexible compaction basis, wherein a compacted indication of a passing test result is available at a debug cluster basis. The non-intuitive debug component is configured to resolve a failed test result available at the debug cluster basis in accordance with a non-intuitive debug methodology. The non-intuitive debug methodology identifies a member within a respective debug cluster that is associated with a respective one of the plurality of processing cores that has a fault. In one exemplary implementation, a set comprising at least one processing core is considered a cluster. In one exemplary implementation, a set comprising more than one of the plurality of processing cores and less than all of the processing cores is considered a cluster. The hierarchy of debug clusters can be organized in levels, wherein the number of processing cores in a debug cluster differs at different levels. A respective debug cluster at a particular level includes members and different levels can correspond to a debug hierarchy.

In one embodiment, compaction includes comparison of test results from different debug clusters or processing cores. Test results of the respective processing cores within a respective debug cluster can be compared together and the output of the comparison indicates whether or not respective processing cores in the respective cluster passed the test. The tests results of the respective plurality of processing cores within a respective debug cluster can be logically XORed together and the output of the logical XOR indicates whether or not respective processing cores in the respective debug cluster pass the test. The test results of the respective members within a respective debug cluster can be logically ORed together and the output of the logical ORing indicates whether or not respective members in the respective debug cluster pass the test. In one embodiment, a respective plurality of processing cores in a respective debug cluster can be logically XORed together in one level of a debug hierarchy and a respective plurality of debug clusters can be logically ORed in another level of the debug hierarchy. In one exemplary implementation, tests results of members in the respective debug cluster are fed into respective priority encoders on an iterative or -progressive basis through a debug hierarchy, wherein the priority encoders are configured to identify a particular member of the debug cluster with a fault indication. In another exemplary implementation, tests results of the plurality of members in the respective debug cluster are fed into a two dimensional core array debug infrastructure on an iterative or progressive basis through a debug hierarchy, wherein the two dimensional core array debug infrastructure is configured to identify a particular member within the debug cluster with a fault indication. An identified core with a fault indication can be a highest priority processing core. In one exemplary implementation, respective ones of the plurality of processing cores that are identified as having a fault are adjusted to mitigate impacts associated with the fault.

In one embodiment, a method includes: assigning a plurality of processing cores into a plurality of debug clusters; performing testing on the plurality of processing cores; compacting results of the testing, and identifying a respective one of the plurality of processing cores that has a fault indication associated with the testing, wherein the identifying is based upon a non-intuitive debug methodology. In one exemplary implementation, the processing cores can be identical or substantially the same. The testing can include performing a comparison operation on respective test results from respective ones of the plurality of processing cores assigned to a respective one of the plurality of debug clusters. The processing cores can be organized in levels comprising debug clusters, and wherein the number of processing cores in a debug cluster differs at different levels.

The different levels can correspond to a debug hierarchy. The number of processing cores in a debug cluster can be flexibly configurable.

The comparison operation can include performing a logical operation (e.g., OR, XOR, etc.). The identifying a respective one of the plurality of processing cores that has a fault indication associated with the testing can include a priority encoding process. In one exemplary implementation, the priority encoding process includes: associating respective ones of the plurality of processing cores with a respective priority code; and encoding the fault indication with a respective priority code associated with one of the plurality of processing cores that has a fault; and identifying, based on the respective priority code and the fault indication, a respective one of the plurality of processing cores associated with a fault. The identifying a respective one of the plurality of processing cores that has a fault indication associated with the testing can include a 2-D core array debug process. In one exemplary implementation the 2-D core array debug process includes: gathering test results on a two dimensional basis corresponding to a debug cluster array configuration; performing a scan out operation to output the results; and identifying one of the plurality of processing cores that has a fault based upon a failing indication in the results from the debug flip flop components. The identifying can be based upon a failure indication in a row and column associated with a two dimensional array configuration of the processing cores. The steps of the priority encoding process and the 2-D core array debug process (e.g., associating processing cores with a priority code; encoding the fault indication, identifying a respective processing core that has a fault indication, etc.) can be performed on an iterative debug cluster basis through various levels a debug hierarchy. The fault indication is associated with a test cycle. Identifying the respective one of the plurality of processing cores that has a fault indication associated with the testing is performed on a test cycle basis. The test results and identity of faulty ones of the plurality or processing cores can be communicated off chip.

DESCRIPTION OF THE DRAWINGS

The accompanying drawings, which are incorporated in and form a part of this specification, are included for exemplary illustration of the principles of the present invention and are not intended to limit the present invention to the particular implementations illustrated therein. The drawings are not to scale unless otherwise specifically indicated.

Figure 1A:
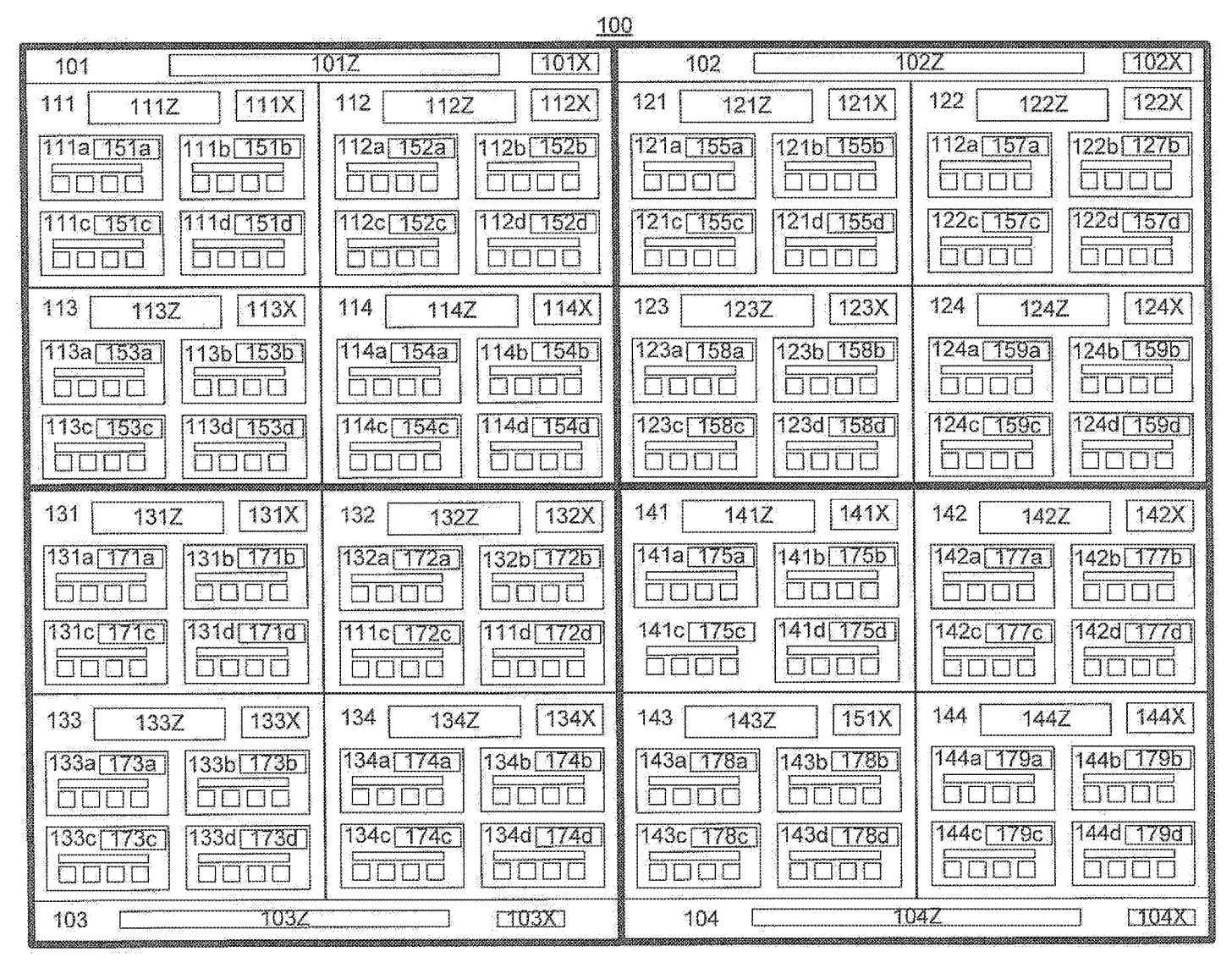

FIG. 1A is a block diagram of an exemplary multi-core chip in accordance with one embodiment.

FIG. 7B is a flow chart of a non-intuitive debugging process in accordance with one embodiment.

FIG. 7C is a flow chart of another non-intuitive debugging process in accordance with one embodiment.

DETAILED DESCRIPTION

Figure 1B:
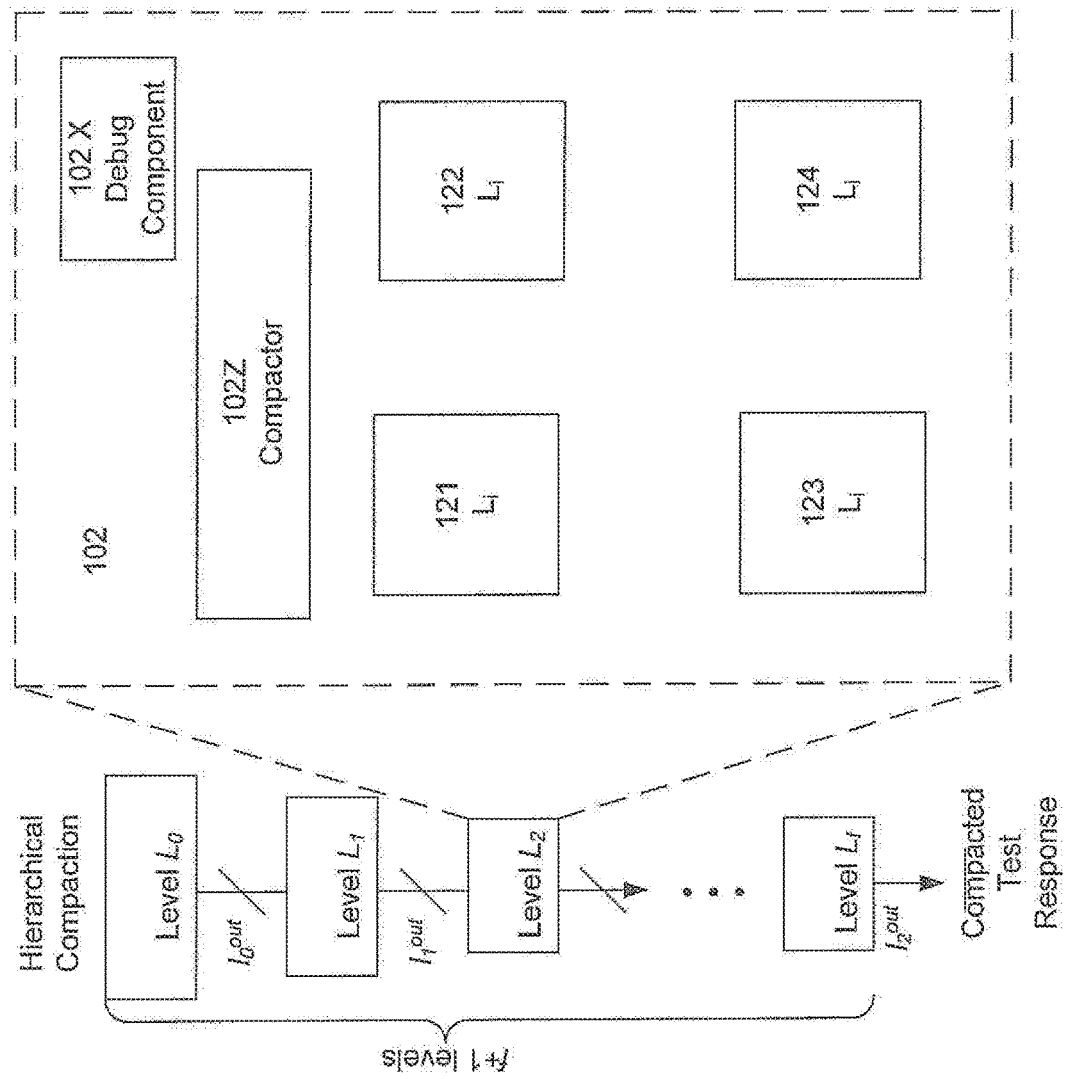
FIG. 1B is a block diagram of an exemplary level two debug configuration in accordance with one embodiment.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail so as not to unnecessarily obscure aspects of the current invention.

In one embodiment, both testing and debug operations are implemented. Testing operations typically involve operating a circuit under test (CUT) in a particular manner (e.g., closed environment, particular controlled inputs, etc.) and observing the results. The testing can include shifting information onto a chip in a controlled manner, performing a deterministic operation, and shifting the results off the chip. Debug activities are directed at objectives or functions based on the results of the testing. The objectives or functions can include identifying a faulty part or component of a CUT, learning about a problem with the CUT, repairing the faulty part or component, reconfiguring the CUT to avoid a problem (e.g., disabling a faulty part, rerouting signals, etc,), and so on. In one embodiment, a debug function includes identifying the faulty part of a CUT (e.g., to aid in determining a problem with a CUT, etc.) and repair of the CUT (e.g., reconfiguring the CUT, disabling the faulty part, rerouting, etc.).

Presented hierarchical test solutions can take advantage of core similarity and significantly reduce test and debug efforts (e.g., ATPG time, memory requirements, test times, labor, etc.). The test results coming from multiple similar or identical cores are properly compacted before they are off-loaded to a tester to save test time and cost associated with test result communication. In one exemplary implementation, test compaction includes compacting test result data on chip so that relatively few bits are transported off chip to a tester for analysis. To make a hierarchical test solution more efficient, a corresponding debug capability is added so that a failing or faulty component is efficiently handled. In one embodiment, an efficient debugging method can include activities that help quickly identify a faulty component and salvage the multi-core processor (e.g., reconfiguring the CUT, disabling the faulty part, rerouting, etc.). Salvaging a multi-core processor can improve yield and reduce overall costs.

In one embodiment, test results are compacted, including indications of a fault. The compaction can be implemented at various hierarchical levels. In one embodiment, the amount or extent of compaction differs between levels. The amount or extent of compaction can correspond to the configuration of cores and clusters. A debug cluster can also be referred to as a cluster. A debug operation can be based upon or performed in response to a fault or error test result indication. A fault indication can correspond to the configuration of cores and clusters in a hierarchical level. Similarly, a debug operation can correspond to the configuration of cores and clusters in a hierarchical level. It is appreciated the terms cluster and debug cluster can be used to indicate a cluster associated with debug operations.

In one embodiment, a non-intuitive debugging methodology is utilized (e.g., priority encoding embodiment, two dimensional (2-D) core array embodiment, etc.). The selection or use of a particular debugging methodology can be based on a number of factors (e.g., debug system hardware requirements, off chip communication bandwidth, time consumption associated with debug iterations, etc.). In general, non-intuitive debugging methodologies involve less hardware costs and time consumption than intuitive debugging methodologies. The primary focus of this application is on non-intuitive debugging methodologies, and as such, exemplary implementations of non-intuitive systems are presented first in this description (intuitive systems are presented later in the description).

FIG. 1A is a block diagram of an exemplary multi-core chip 100 in accordance with one embodiment. In one exemplary implementation the multi-core chip 100 includes many identical processing cores. Multi-core chip 100 includes multiple processing cores configured in a debug compatible hierarchy. In one embodiment, the debug compatible hierarchy includes multiple levels. The processing cores are grouped or assigned to clusters and the configuration of the clusters can change from level to level of the debug compatible hierarchy. In one embodiment, a debug compatible hierarchy includes level $l_0$, $l_1$, $l_2$, and $l_3$. Level $l_3$ includes clusters 101, 102, 103 and 104 which includes respective compaction components 101Z, 102Z, 103Z and 104Z and respective debug components 101X, 102X, 103X, and 104X. The respective compaction components compact test results from components in the cluster and the respective debug components perform debug operations for the cluster if there is an indication of a fault in the test results. The debug operations can include identifying the component within the cluster that had a fault indication.

Cluster 101 includes clusters 111, 112, 113, and 114 which include respective compaction components (e.g., 111Z, 112Z, 113Z, and 114Z) and respective debug components (e.g., 111X, 112X, 113X, and 114X). Cluster 102 includes clusters 121, 122, 123, and 124 which include respective compaction components (e.g., 121Z, 122Z, 123Z, and 124Z) and respective debug components (e.g., 121X, 122X, 123X, and 124X). Cluster 103 includes clusters 131, 132, 133 and 134 which include respective compaction components (e.g., 131Z, 132Z, 133Z, and 134Z) and respective debug components (e.g., 131X, 132X, 133X, and 134X). Cluster 104 includes clusters 141, 142, 143, and 144 which include respective compaction components (e.g., 141Z, 142Z, 143Z, and 144Z) and respective debug components (e.g., 141X, 142X, 143X, and 144X).

Cluster 111 includes clusters 111a, 111b, 111c, and 111d which include respective debug components (e.g., 151a, 151b, 151c, and 151d). Cluster 112 includes clusters 112a, 112b, 112c, and 112d which include respective debug components (e.g., 152a, 152b, 152c, and 152d). Cluster 113 includes clusters 113a, 113b, 113c, and 113d which include respective debug components (e.g., 153a, 153b, 153c, and 153d). Cluster 114 includes clusters 114a, 114b, 114c, and 114d which include respective debug components (e.g., 154a, 154b, 154c, and 154d).

In one embodiment, the clusters at the lowest or most granular level can include processing cores and compaction components. In one exemplary implementation, clusters such as 112a, 113c, 124d, 134a, 144d, and so on include respective processing cores (shown as small squares) and respective compaction components (shown as rectangles above the small squares). FIG. 1D is a block diagram of an exemplary lowest level or level zero debug configuration of cluster 124d in accordance with one embodiment. Cluster 124d includes compactor 190 and processing cores 191, 192, 193, and 194. The lowest or most granular level can also include a debug component. In one exemplary implementation, cluster 124d includes debug component 159b.

Cluster 121 includes clusters 121a, 121b, 121c, and 121d which include respective debug components (e.g., 155a, 155b, 155c, and 155d). Cluster 122 includes clusters 122a, 122b, 122c, and 122d which include respective debug components (e.g., 157a, 157b, 157c, and 157d). Cluster 123 includes clusters 123a, 123b, 123c, and 123d which include respective debug components (e.g., 158a, 158b, 158c, and 158d). Cluster 124 includes clusters 124a, 124b, 124c, and 124d which include respective debug components (e.g., 159a, 159b, 159c, and 159d).

Cluster 131 includes clusters 131a, 131b, 131c, and 131d which include respective debug components (e.g., 171a, 171b, 171c, and 171d). Cluster 132 includes clusters 132a, 132b, 132c, and 132d which include respective debug components (e.g., 172a, 172b, 172c, and 172d). Cluster 133 includes clusters 173a, 173b, 173c, and 173d which include respective debug components (e.g., 173a, 173b, 173c, and 173d). Cluster 134 includes clusters 134a, 134b, 134c, and 134d which include respective debug components (e.g., 174a, 174b, 174c, and 174d).

Cluster 141 includes clusters 141a, 141b, 141c, and 141d which include respective debug components (e.g., 175a, 175b, 175c, and 175d). Cluster 142 includes clusters 142a, 142b, 142c, and 142d which include respective debug components (e.g., 177a, 177b, 177c, and 177d). Cluster 143 includes clusters 143a, 143b, 143c, and 143d which include respective debug components (e.g., 178a, 178b, 178c, and 178d). Cluster 144 includes clusters 144a, 144b, 144c, and 144d which include respective debug components (e.g., 179a, 179b, 179c, and 179d).

In one embodiment, test results indicate there is fault in chip 100. FIG. 1B is a block diagram of an exemplary level two debug configuration in accordance with one embodiment based upon the fault test result indication from compactor 102Z. Debug component 102X identifies a cluster 121, 122, 123, or 124 corresponding to the fault. In one exemplary implementation, debug component 102X determines a fault is associated with cluster 124.

Figure 1C:
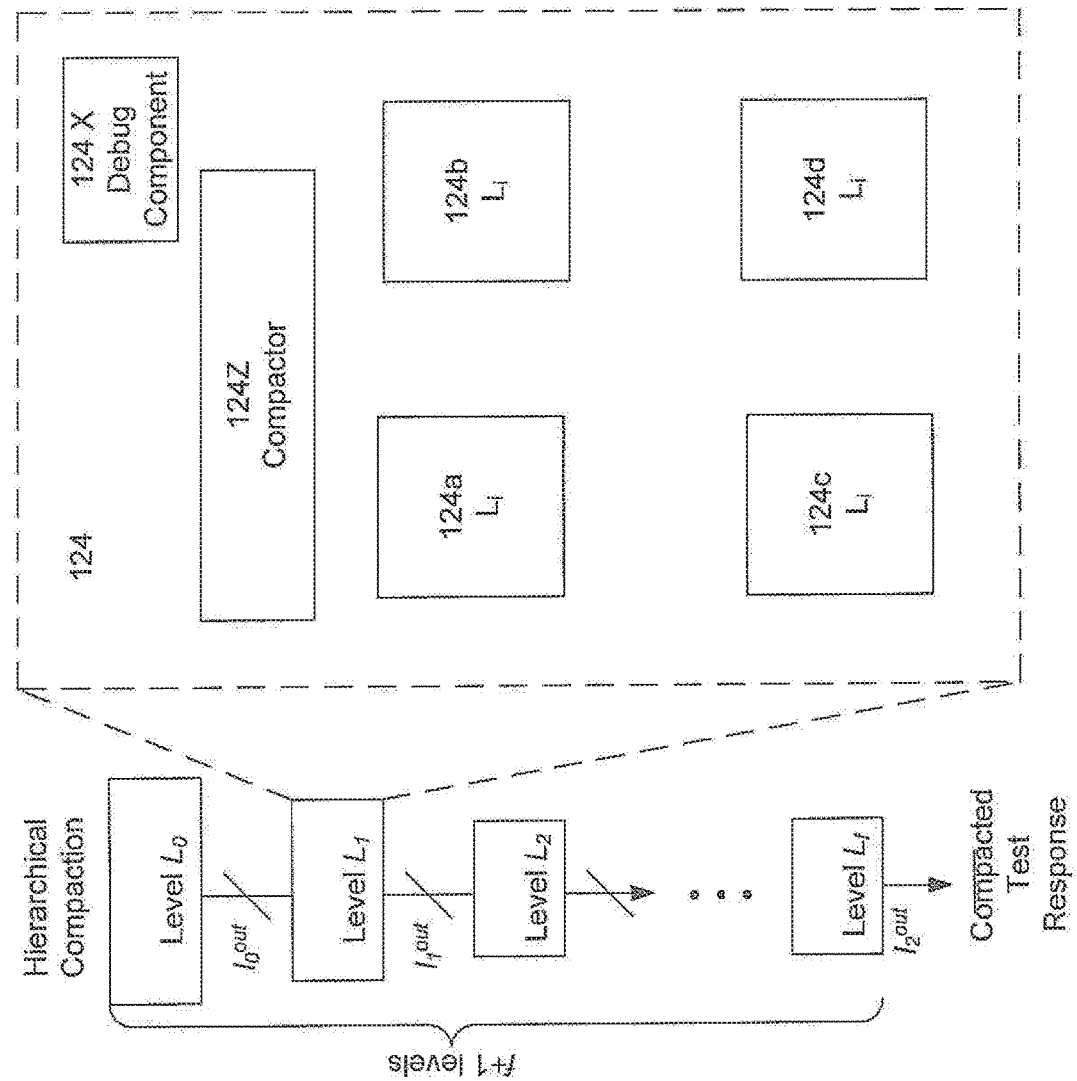
FIG. 1C is a block diagram of an exemplary level one debug configuration in accordance with one embodiment.
Figure 1D:
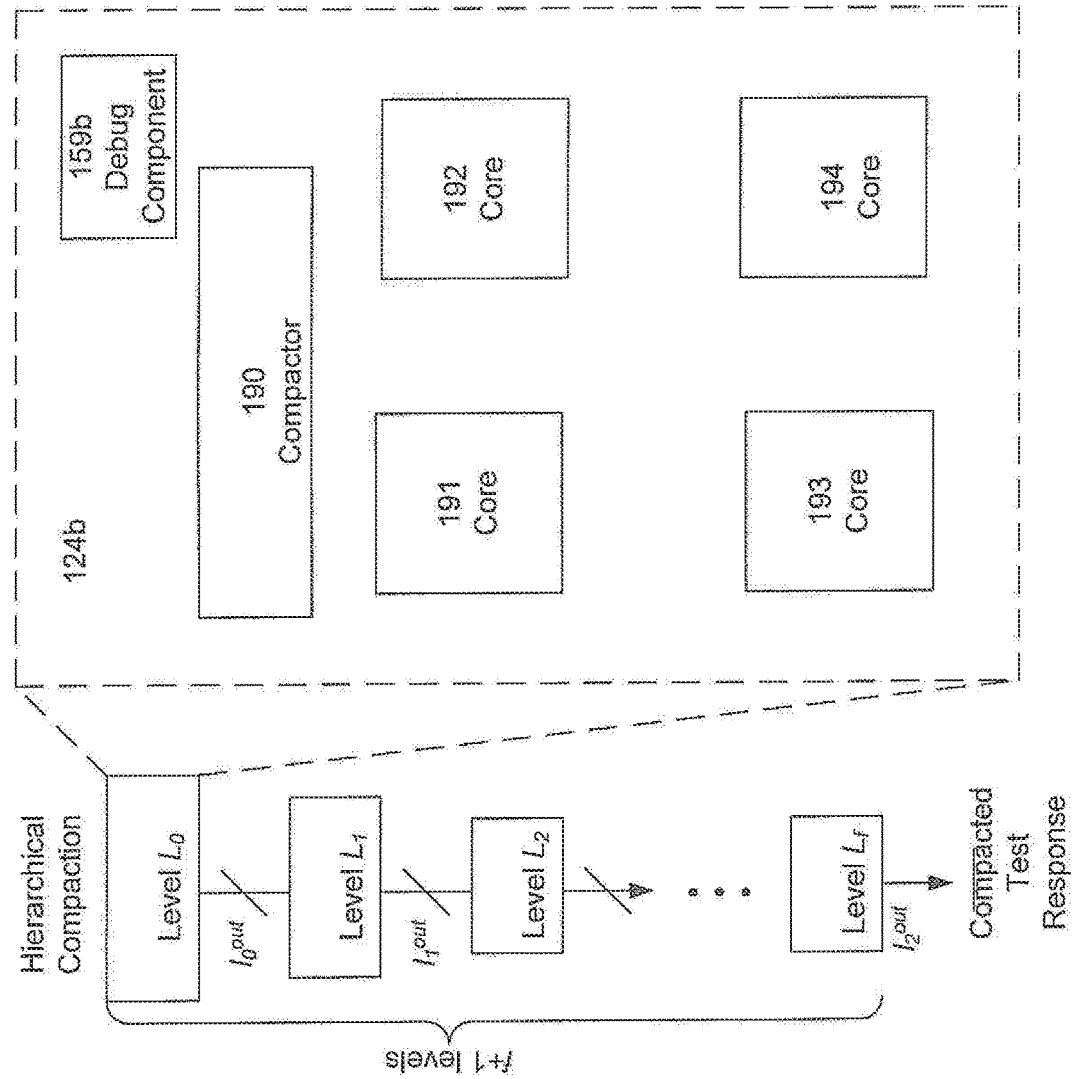
FIG. 1D is a block diagram of an exemplary level zero debug configuration in accordance with one embodiment.

FIG. 1C is a block diagram of an exemplary level one debug configuration in accordance with one embodiment. The level one debug can be based upon a debug component 102X determination that a fault is associated with cluster 124. The level one debug configuration can be based upon a fault test result indication from compactor 124Z. Debug component 124X identifies a cluster 124*a*, 124*b*, 124*c*, or 124*d* corresponding to the fault. In one exemplary implementation, debug component 124X determines a fault is associated with cluster 124*b*.

With reference again to FIG. 1D, the level one debug can be based upon a debug component 124X determination that a fault is associated with cluster 124*d*. The level one debug configuration can be based upon a fault test result indication from compactor 190. Debug component 159*b* identifies a core 191, 192, 193, or 194 corresponding to the fault. In one exemplary implementation, debug component 159*b* determines a fault is associated with core 192. An indication that a fault is associated with core 192 can be communicated off chip. Various additional debug operations can be performed with respect to core 192 (e.g., disabling core 192, rerouting operations around core 192, etc.).

The configurations of clusters can change from level to level of a debug hierarchy. In one embodiment, processing cores are members of a debug cluster at a first level. Processing cores 191 through 194 are members of cluster 124 in level $l_0$. In one embodiment, clusters at one level are considered members of a cluster at another level. Clusters 124*a* through 124*d* at level $l_0$ are members of cluster 124 at level $l_1$ and clusters 121 through 124 are members of Cluster 102 at level $l_2$. In one embodiment, a debug component identifies a failing member corresponding to a fault within the cluster. In one exemplary implementation, debug component 124X determines a fault is associated with cluster 124*b* which is a member of cluster 124, and debug component 159*b* determines the fault is associated with core 192 which is a member of cluster 124*b*.

In one embodiment, a compaction component is a comparator. In one exemplary implementation, a comparator is a logical operation component (e.g., a logical OR component, a logical XOR component, etc.). Output from a plurality of processing cores in a respective debug cluster can be logically XORed together in one level of a debug hierarchy and output from a respective plurality of debug clusters can be logically ORed in another level of the debug hierarchy. In one exemplary implementation, test results are XORed in a lowest level (e.g., first level, level 1, level $l_0$, etc.) or level in which cluster members are processing cores, and test results are ORed in other levels (e.g., second level, third level, level 1, level $l_1$, level $l_3$, etc.) or levels in which cluster members are clusters from lower levels.

Test result compaction components can be configured to compact results on a flexible compaction basis. In one embodiment the number of members in a cluster that are fed into a corresponding compactor can vary. In one exemply implementation, there are 4 processing cores included and compacted in a cluster. In another exemplary implementation there are 8 processing cores included and compacted in a cluster.

It is appreciated that there are a variety of compaction and debug approaches that can be implemented. In one embodiment, selection of a debug approach is independent of a compaction approach. Some of the following description includes explanation of different debug implementations. For ease of use the notation, $L_i$ will be utilized to indicate a cluster. A cluster can include one or more members (e.g., processing cores, clusters from another hierarchy level, etc.). It is appreciated that the terms "processing core" and "core" are used interchangeably. The number of cores in a cluster can depend upon the hierarchy level of the cluster.

In one embodiment, a 2 dimensional or 2-D core/cluster array debug infrastructure is utilized. In a 2-D core/cluster array, a cluster member's test results per test cycle are logically compared (e.g., logically "ORed", "XORed", etc.) with test results from other cluster members and then accumulated in a debug flop. The flops can be communicatively coupled to a debug scan chain and the test results communicated to the debug scan chain for cycle-by-cycle debugging. A scan chain can include flops in a DUT organized into one or more shift registers coupled together in a chain so that test patterns can be loaded into the DUT and test results can be downloaded from the DUT. In one exemplary implementation, sufficient identification of a faulty component is achieved without a flop per cluster member, which can significantly reduce hardware overhead compared to traditional approaches. In a typical debug process, a test procedure is run first and a determination is made if a CUT fails to properly respond to a test input pattern. In one embodiment, that determination can be based upon a specific failing clock cycle. If a fault is found, the 2-D debug mechanism is activated and the failing test input pattern is rerun. At the specific failing cycle, the pattern is stopped and dumping out the content of the debug chain is started to determine the failing cluster member. In one embodiment, a multiple input signature register (MISR) based test compactor is used. In one exemplary implementation of a MISR based test compactor, the failing cycle may not be exact. In one exemplary implementation, a debug chain can be dumped or unloaded for multiple failing test cycles. The failing cluster member is identified by the failing debug flops observed from dumping out the debug chain content. In one exemplary implementation, if a particular cluster member fails (e.g., the top left cluster member, middle cluster member, bottom right cluster member, etc.) at a specific clock cycle, the pattern is stopped at that failing cycle, and the failing debug flops are observed. In one embodiment, a single failing cluster member can be uniquely identified by the failing status of the debug flops.

Figure 2:
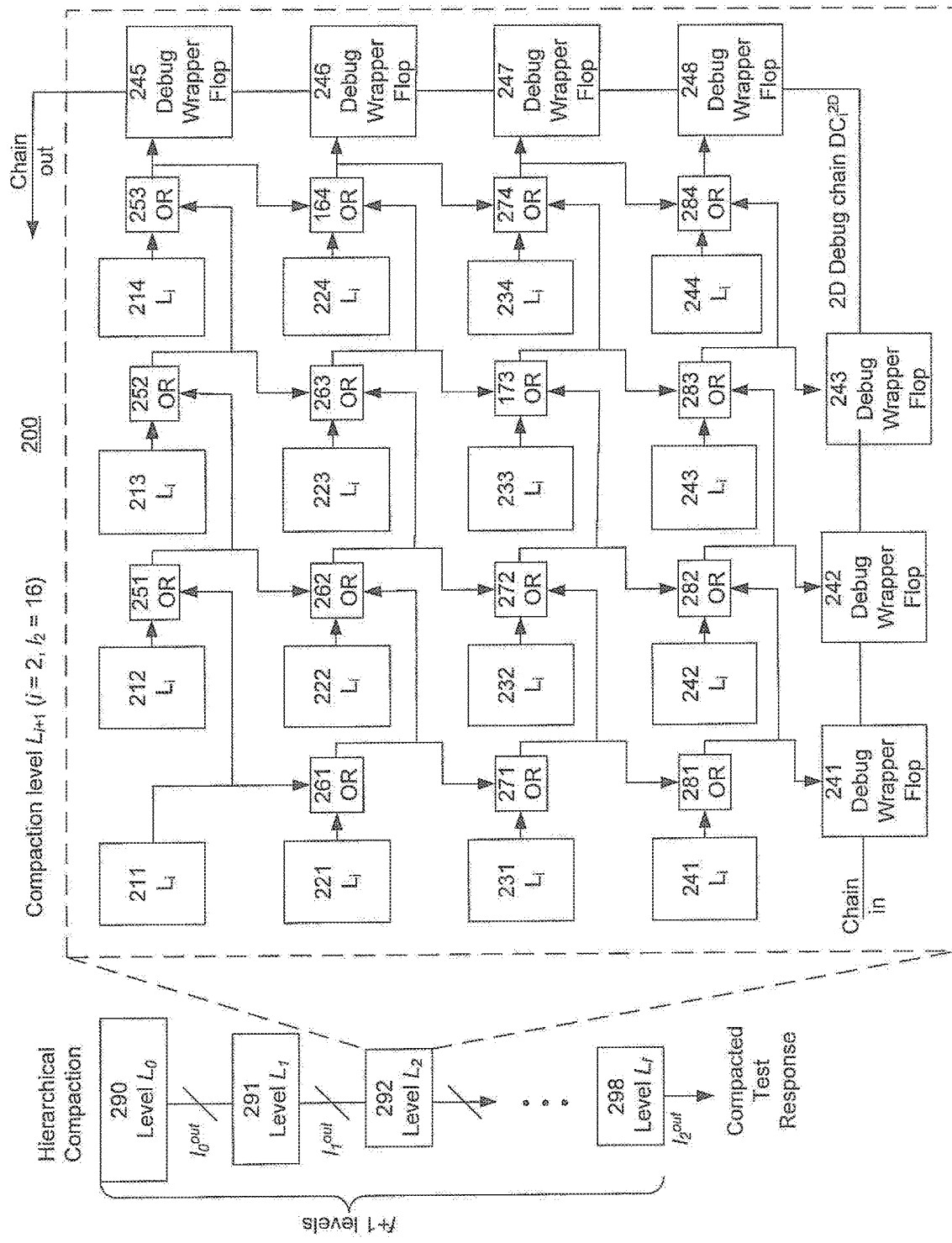
FIG. 2 is a block diagram of an exemplary processing component accordance with one embodiment.

FIG. 2 is a block diagram of an exemplary processing component 200 accordance with one embodiment. The processing component 200 is configured in accordance with a 2-D core/cluster array debug infrastructure and 2D debugging methodology hierarchical compaction. Processing component 200 includes clusters 211 through 244, comparator components 251 through 284, and debug wrapper flops 241 through 248. The clusters 211 through 244, comparator components 251 through 284, and debug wrapper flops 241 through 248 are configured for level 2 compacted test response. It is appreciated that processing component 200 can be reconfigured for various compaction levels as shown by compaction level $l_0$ 290, level $l_1$ 291, level $l_2$ 292, and level $L_f$ 198.

In one embodiment, there is a series of OR gates that logically "OR" the output of a cluster or core before it goes to the next cluster or core. In one exemplary implementation, the logical "OR" is actually going in both the X dimension and Y dimension. The X-dimension can be thought of as corresponding to the rows and the Y-dimension can be thought of as corresponding to the columns. The results of the logical "ORing" along a row or column is conveyed to a respective debug wrapper flops (e.g., 241 through 248, etc.). In one embodiment, each of the debug wrapper flops registers the data for a respective row or column. In one exemplary implementation, a core at the second row second column location fails and three row debug wrapper flops indicate a fail and two column debug wrapper flops indicate a fail. The other flops are fault free. The results in the debug wrapper flops are chained together and shifted out. Thus, the failing core can be identified as the core at the core at the second row second column location.

In one embodiment, similar operations can be performed using a logical "XOR" in both the X dimension and Y dimension.

A similar architecture or configuration of debug clusters, compaction components, and priority encoder can be implemented at various levels (e.g., $L_0$, $L_1$, $L_2$, $L_f$, etc.). The 2-D core/cluster array debug processes can be performed on an iterative or progressive basis as debug operations traverse through the levels of a debug hierarchy.

If more than one cluster member (e.g., processing core, cluster from other level, etc.) fails, but each fails at a different cycle, the 2-D debug infrastructure is capable of identifying each failing cluster member. If more than one cluster member fails in the same cycle, utilizing the 2-D debug infrastructure to uniquely identify both failing cluster members may be problematic.

A priority encoder approach can be utilized to identify a faulty processing core. The outputs of cluster members (e.g., cores, clusters from another level, etc.) are gathered and fed into an encoder to form a code indicating the failure status of a cluster member. In one exemplary implementation, if one or more cluster members fail at a specific test cycle, then the corresponding output of the encoder indicates the failing cluster member with respect to a priority. It is appreciated that priority can be based upon various things (e.g., respective location in a test chain, complexity of respective cores, etc.). In one embodiment, a failing core with the highest priority is identified. Multiple cores can fail and the system can identify at least one of them. It is appreciated that a test compactor can also be included in or utilized with a priority encoder approach.

Figure 3A:
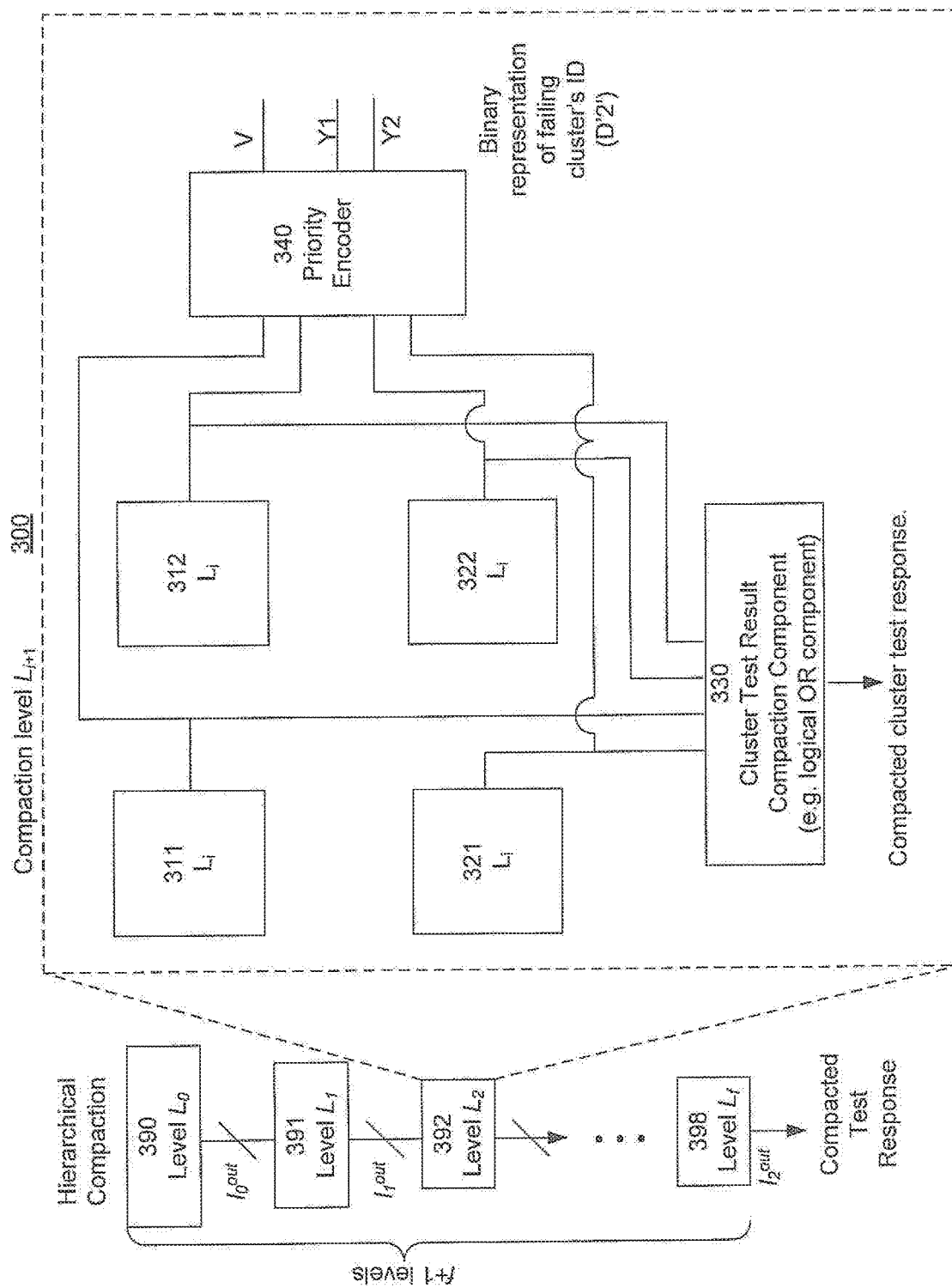
FIG. 3A is a block diagram of an exemplary processing component in accordance with one embodiment.

FIG. 3A is a block diagram of an exemplary processing component 300 in accordance with one embodiment. The processing component 300 is configured in accordance with a priority encoder methodology hierarchy. It is appreciated the hierarchy can also include compaction (e.g., comparison, logical OR operation, logical XOR operation, etc.). Processing component 300 includes priority encoder 340 and debug clusters 311, 312, 321, and 322. Processing component 300 can also include compaction or comparator component 330. A similar architecture or configuration of debug clusters, compaction components, and priority encoder can be implemented at various levels (e.g., $L_0$, $L_1$, $L_2$, $L_f$, etc.). Priority encoding processes can be performed on an iterative or progressive basis as debug operations traverse through the levels of a debug hierarchy.

In one embodiment, a priority encoder methodology hierarchy can handle more than one cores failing at exactly the same test cycle. In addition to reporting a group of possible faulty cores, the priority encoder methodology hierarchy can identify a particular failing core. In one embodiment, in which more than one core can be faulty and if all the debug flops are failing, a 2D debugging methodology hierarchy is limited to indicating one or more of the cores in the 4×4 group can fail, but cannot say exactly which one. In another embodiment, if more than one core is faulty and a priority encoding debugging methodology hierarchy is utilized, it can indicate one or more of the cores in the 4×4 group can fail and also indicate exactly which one. A key benefit can be for $n_2l_i$-clusters, only $[2 \log_2 n]$ debug flops are required to identify the failing cluster.

It is appreciated that a variety of considerations can be utilized to establish a priority of a respective cluster member or component. In one embodiment, the components are assigned a ranked order value. In one exemplary implementation, respective component is assigned a respective value and a correspondence is established between the respective value and a respective priority.

Figure 3B:
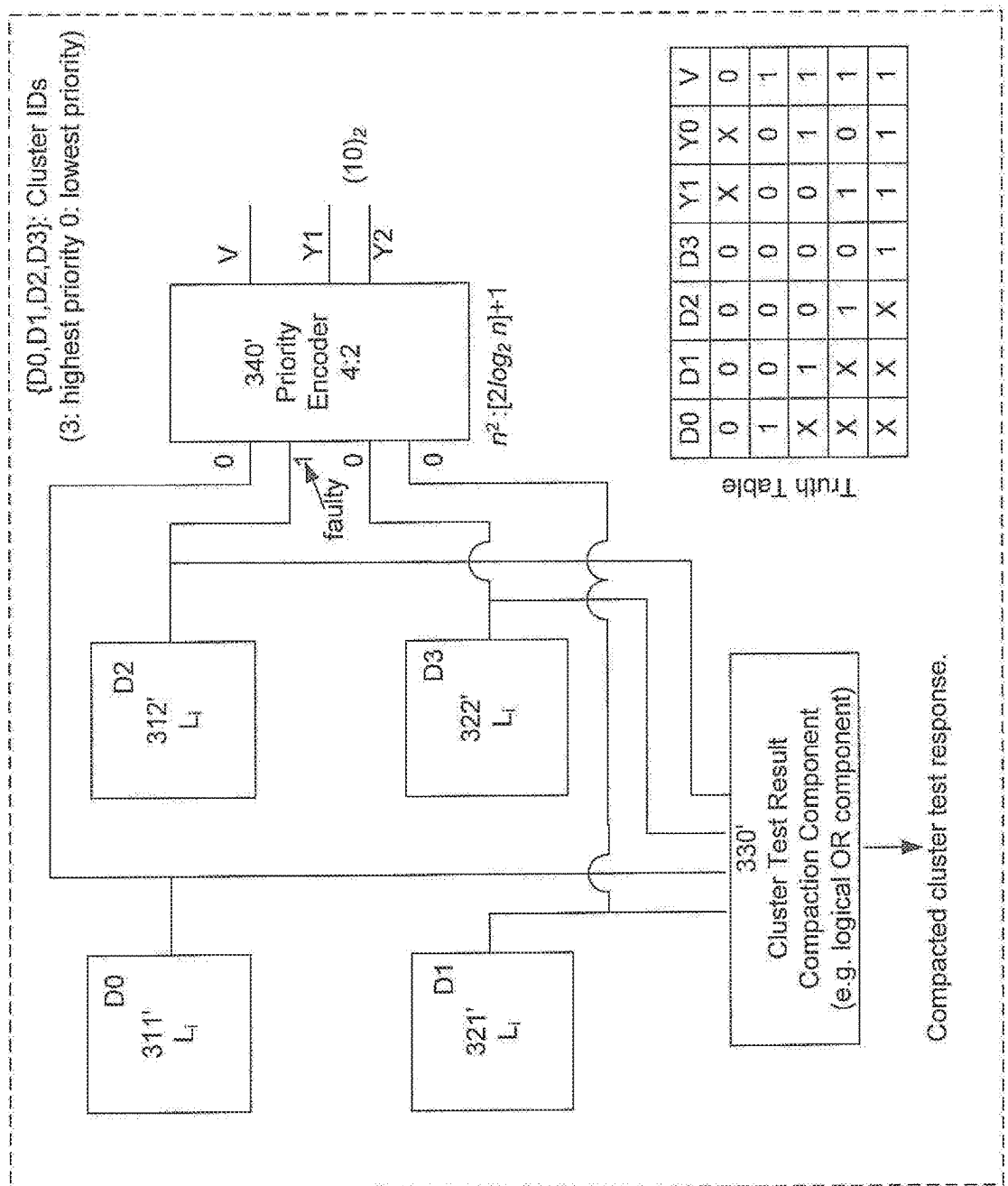
FIG. 3B illustrates exemplary identification of a cluster from another level that includes a failing core in accordance with one embodiment.
Figure 3C:
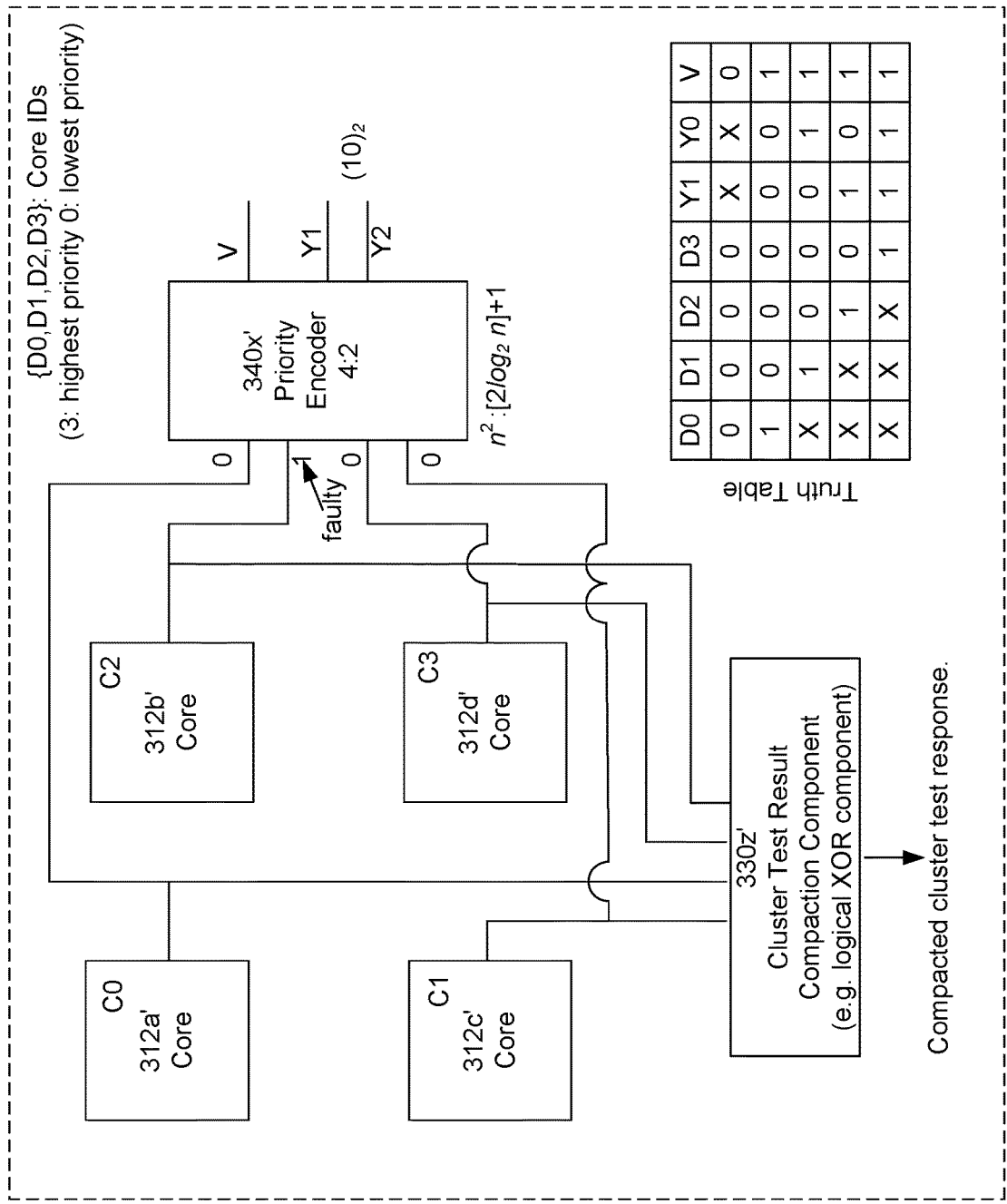
FIG. 3C illustrates exemplary identification of a failing core within a cluster at the other level in accordance with one embodiment.

FIGS. 3B and 3C are exemplary implementations in accordance with one embodiment in which a particular failing processing core is identified. FIG. 3B illustrates identification of a cluster from another level that includes a failing core. The clusters 311' through 322' are assigned values 0 through 3 respectively, and the values correspond to a relative priority of the clusters. The testing results from clusters 311' through 322' are forwarded to compactor 330'. In one exemplary implementation cluster 312' has a fault indication that is forwarded to priority encoder 340'. The truth table indicates that the output Y1Y0V at this cluster level is 101 for the fault indication. FIG. 3C illustrates identification of a failing core within a cluster at the other level. The cores 312a' through 312d' are assigned values 0 through 3 respectively, and the values correspond to a relative priority of the cores. The testing results from cores 312a' through 312d' are forwarded to compactor 330z'. In one exemplary implementation, core 312b' has a fault indication that is forwarded to priority encoder 340x'. The truth table indicates that the output Y1Y0V at this core level is 101 for the fault indication.

Figure 4:
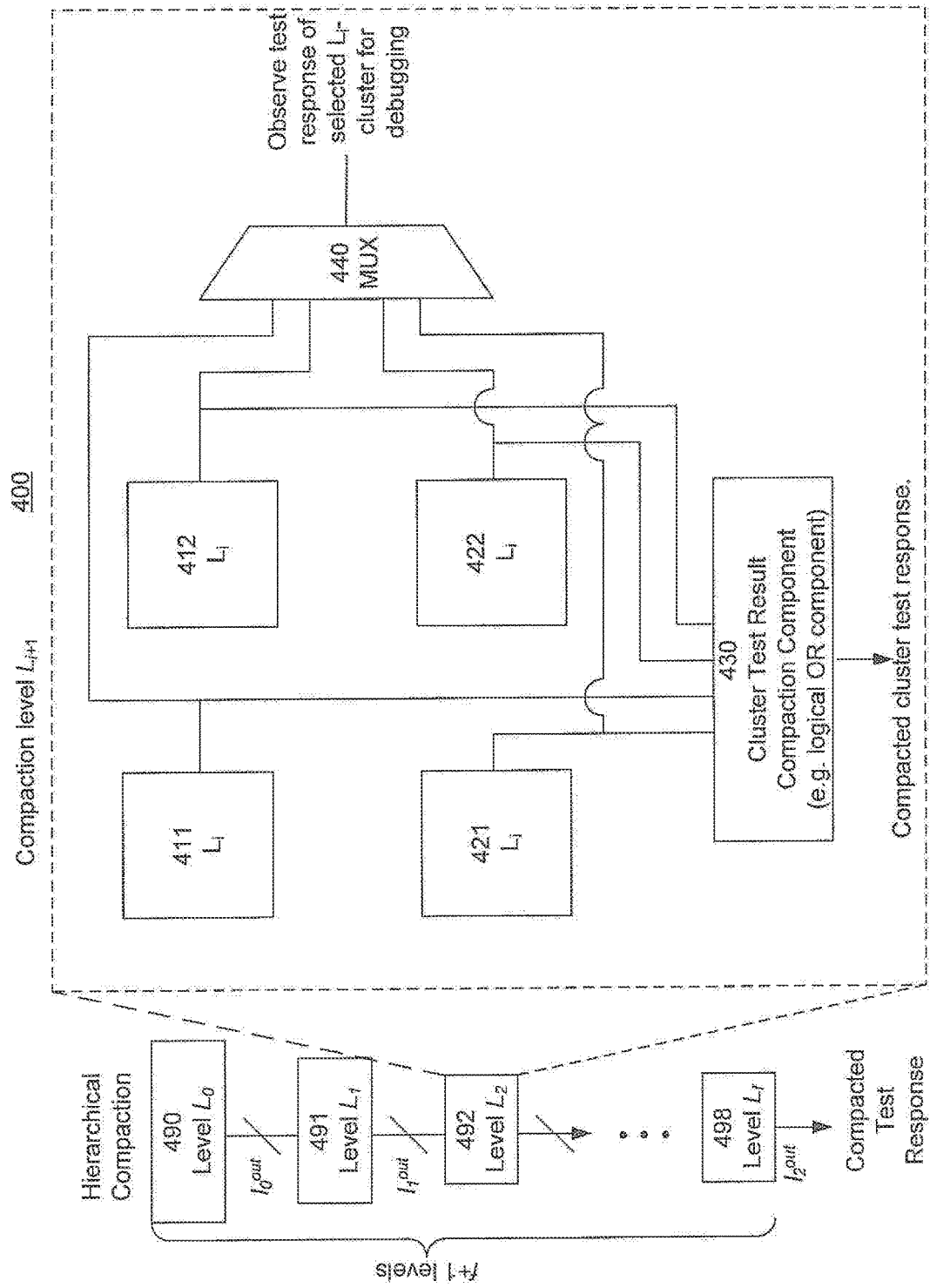
FIG. 4 is a block diagram of an exemplary processing component in accordance with one embodiment.

While the debugging described herein is primarily directed to non-intuitive methodologies, a few intuitive embodiments are presented to highlight some of the differences between non-intuitive and intuitive approaches. In one embodiment, an intuitive solution can be implemented in which an extra circuit is added such that if the CUT fails test, a process can check each core individually to know if it is failing or not. FIG. 4 is a block diagram of an exemplary processing component 400 in accordance with one embodiment. The processing component 400 is configured in accordance with a time multiplexed debugging methodology hierarchy with integrated with test result compaction. It is appreciated the hierarchy can also include compaction. Processing component 400 includes MUX 440 and cluster members (e.g., processing cores, clusters at another level, etc.) 411, 412, 421, and 422. Processing component 400 can also include cluster test result compactor component 430. In one embodiment, FIG. 3 represents a $L_{i+1}$ compaction level.

In FIG. 4 the test response from the cluster members is forwarded to cluster test compaction component 430. If the output of the cluster test compaction component 430 indicates one of the cluster members failed, then the cluster select signal into MUX 440 sequences through the inputs with the test result indication inputs from the cluster members. As the sequence progresses through the select signals it basically becomes a time multiplex operation in which an output of the MUX 440 in a particular time period of the sequence correspondes to one of the cluster members. In one embodiment, for $n^2L_i$-clusters, 1 debug flop is required at a MUX's output to identify the cycle when a selected cluster fails.

Figure 5:
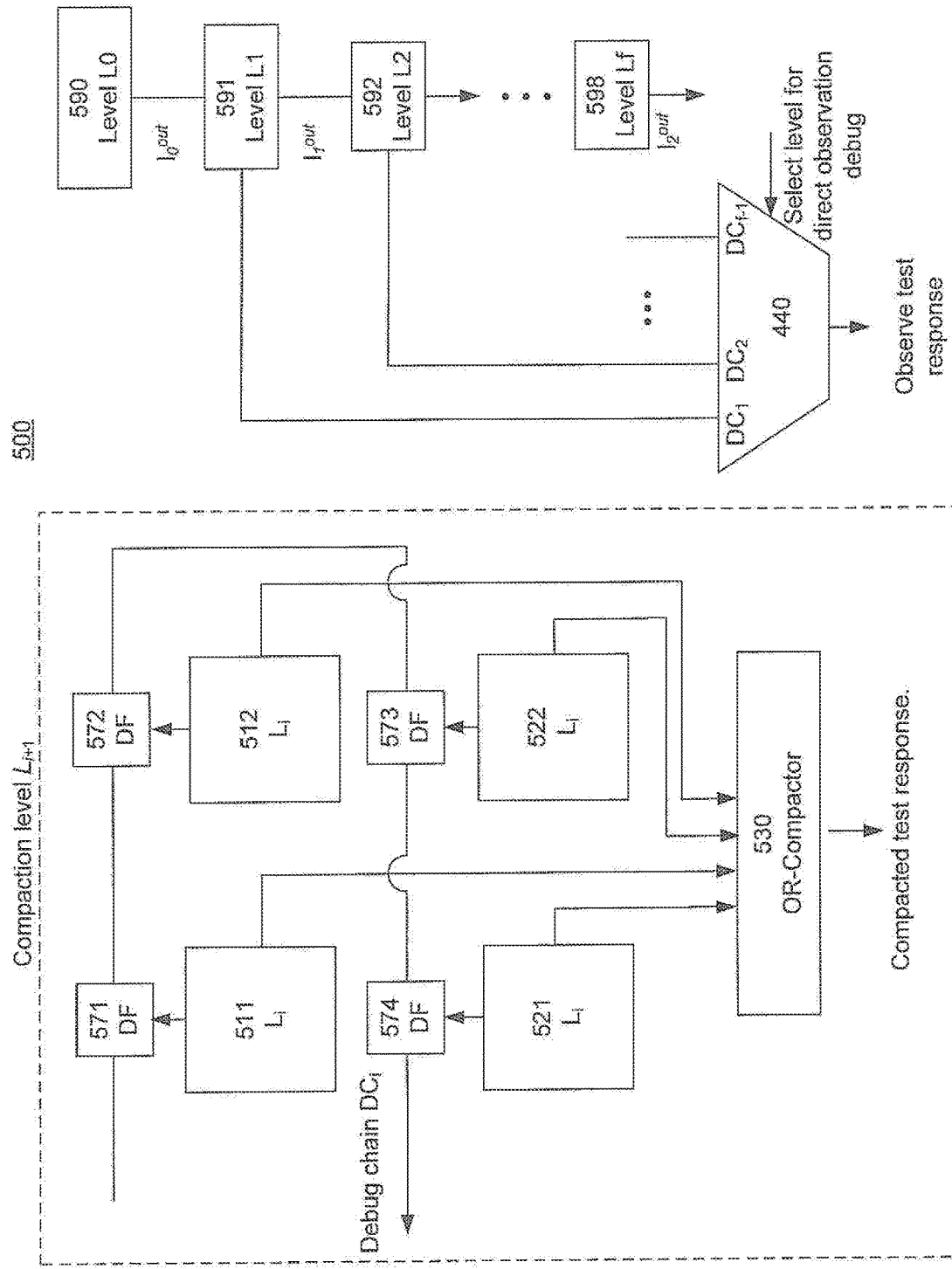
FIG. 5 is a block diagram of an exemplary processing component in accordance with one embodiment.

FIG. 5 is a block diagram of an exemplary processing component 500 in accordance with one embodiment. It is appreciated processing component 500 is considered an intuitive methodology or approach and the hierarchy can include compaction. Processing component 500 includes MUX 540 and cluster members 511, 512, 521, and 522. Processing component 500 can also include comparator component 530. In one embodiment, for $n^2L_i$-clusters, $n^2$ debug flops (571, 572, 573, 574) are required to identify the cycle when a selected cluster fails. The pass/fail status of each cluster Li is stored in the corresponding debug flops (571, 572, 573, 574), which are connected as a debug chain. At the end of test, if fail is identified, the contents of these debug flops will be shifted out for examination. This processing is in accordance with a space multiplexed debugging methodology hierarchy with integrated test compaction.

It is appreciated that different embodiments of testing and debug hierarchy methodologies can have different characteristics and features. There can be a trade off between costs and resources associated with a debug approach and debug capabilities. The trade off can involve balancing a number of factors (e.g., debug system hardware requirements, off chip communication bandwidth, time consumption associated with debug iterations, etc.). The following table is one example a comparative study of different debugging methodologies for a nxn grid of clusters at Li compaction level: n2Li−1 clusters inside one li-cluster.

| Metric | Time-Multiplexed Debugging | Space-Multiplexed Debugging | 2D-Debugging | Priority Encoder base Debugging |
|---|---|---|---|---|
| Hardware overhead (no. of debug flops, proportional to test time) | 1 | N2 | 2n−1 | 2[log2 n] + 1 |
| No. of test iterations to locate single faulty cluster (worst case) | O(n2) | O(1) | O(1) | O(1) |
| No. of test iterations to locate multiple faulty cluster (worst case) | O(n2) | O(1) | O(n2) | O(k) K is the number of faulty Li-1 clusters K << n2 in most practical scenarios. |

It is appreciated that intuitive approaches (e.g., processing component 400, processing component 500, etc.) can involve increased costs over non-intuitive approaches (e.g., processing component 200, processing component 300, etc.). Non-intuitive approaches can require more hardware resources (e.g., more compaction component, more debug components, more flip flops, etc.) and more debug time (e.g., more test time, more debug process iterations, etc.).

Figure 6:
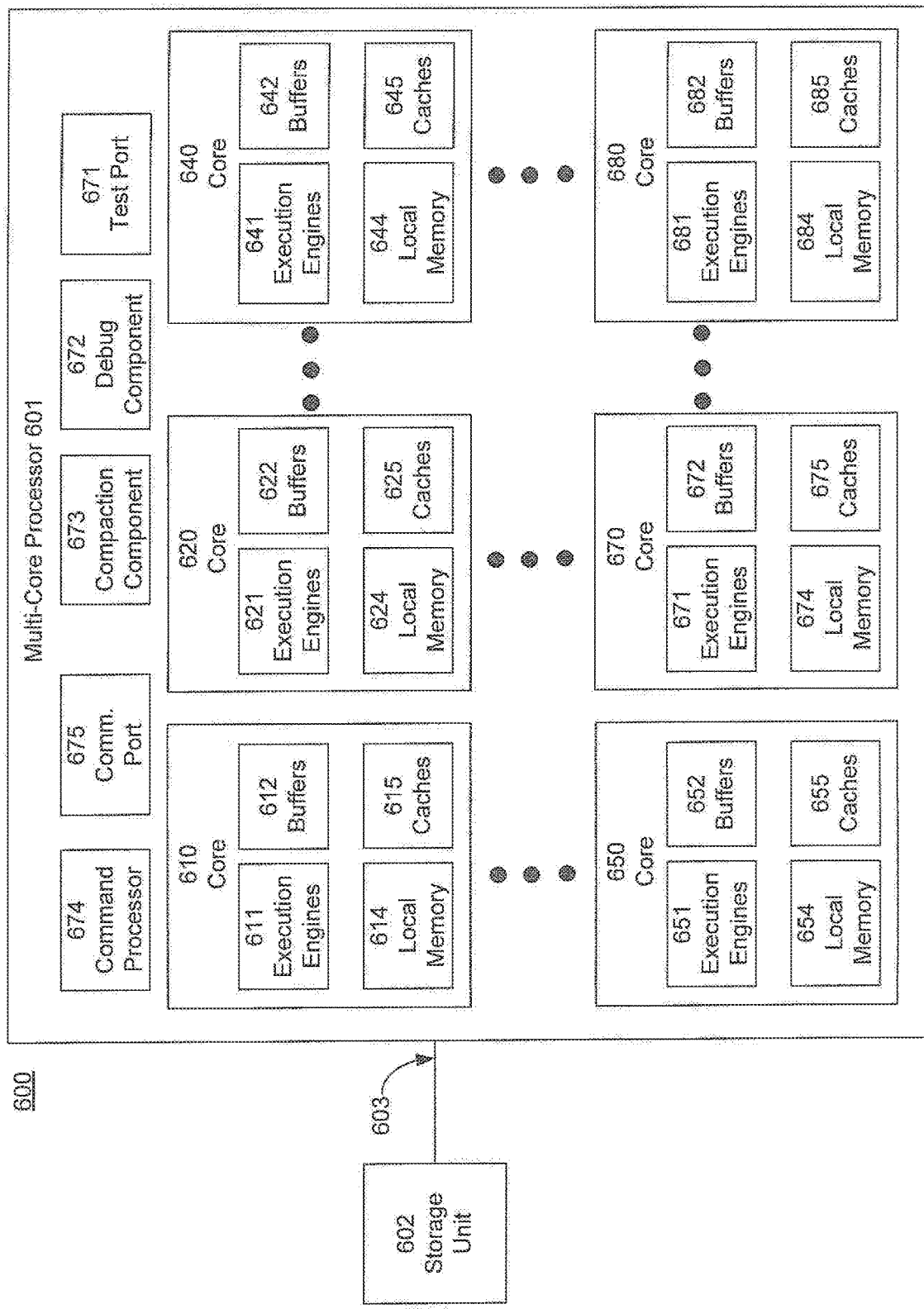
FIG. 6 is a block diagram of an exemplary multi-core chip in accordance with one embodiment.

FIG. 6 is a block diagram illustrating an example system 600 upon which embodiments according to the present invention can be implemented. In general, the system 600 is a type of system that can be used with or in a system or processor (e.g., the systems or processors 100, 200, 300, 400, 500, etc.). In one embodiment, system 600 can used with a processor that encodes and/or decodes graphical data, which includes image data and video data.

In the example of FIG. 6, the system 600 can include one or more storage units (e.g., computer storage media, information storage media, etc.) 602 and a multi-core processor 601 communicatively coupled by a communication interface 603. The processor multi-core 601 can include one or more cores, and each core may include local memory that may be distributed among the cores and one or more execution engines. The communication interface 603 can include a wired network communication link, a wireless network communication link, a data bus, or the like.

In one embodiment, multi-core processor 601 includes test port 610, compaction component 673, debug component 672, command processing component 674, communication port 675, and processing cores 610, 620, 640, 650, 670, and 680. The processing cores (e.g., 610, 620, 640, 650, 670, 680, etc.) include execution engines (e.g., 611, 621, 641, 651, 671, 681, etc.), buffers (e.g., 612, 622, 642, 652, 672, 682, etc.), local memory (e.g., 614, 624, 644, 654, 674, 684, etc.), and caches (e.g., 615, 625, 645, 655, 675, 685, etc.). In one embodiment, multi-core processor 601 is configured in a testing and debug hierarchy (e.g., similar to multi core processors 100, 200, 300, 400, 500, etc). The execution engines can include various types of engines (e.g., tensor engines, pooling engines and memory-copy engines, etc.) and the communication port includes various types of ports (e.g., PCIe4, I$^2$C, etc.). The normal operations or functions can be directed by a sequencer in accordance with instruction from an instruction buffer. In one embodiment, sets of cores can be communicatively coupled together by a ring bus. The command processing component can be an interface between a drive and the multi-core processor. The test port can communicate test information on and off the processor. It is appreciated that multi-core processor can be compatible with various types of test (e.g., joint action test group (JTAG), built-in self test, IEEE 1394, etc.)

In one embodiment, the cores are identical or substantially similar from a test design and debug standpoint. In one embodiment, identical or substantially the same processing cores are ones that when the same values are input, (e.g., same test vector input bit values, same test signal values, etc.) are fed into respective cores, they produce the same output results when operating properly. Hierarchical test and debug solutions can take the advantage of core similarity and significantly reduce test and debug costs.

It is appreciated that multi-core processors can be utilized in association with a variety of application. Multi-core processors can be utilized for artificial intelligence (AI) applications. AI accelerators are usually designed with many similar or identical small cores on the same chip. Most current design for test solutions do not take into account the similar multi core structure of the AI chip, but treat them as a piece of random logic. In one exemplary implementation, a processing engine includes a small core that is the fundamental computing block for artificial intelligence (AI) accelerator. In one exemplary implementation, debugging is used to identify a failing core in a neural network (NN) accelerator. Some integrated circuit chips include design for test configurations or a hardware structures designed and integrated on chip to facilitate testing the chip on a tester.

Figure 7A:
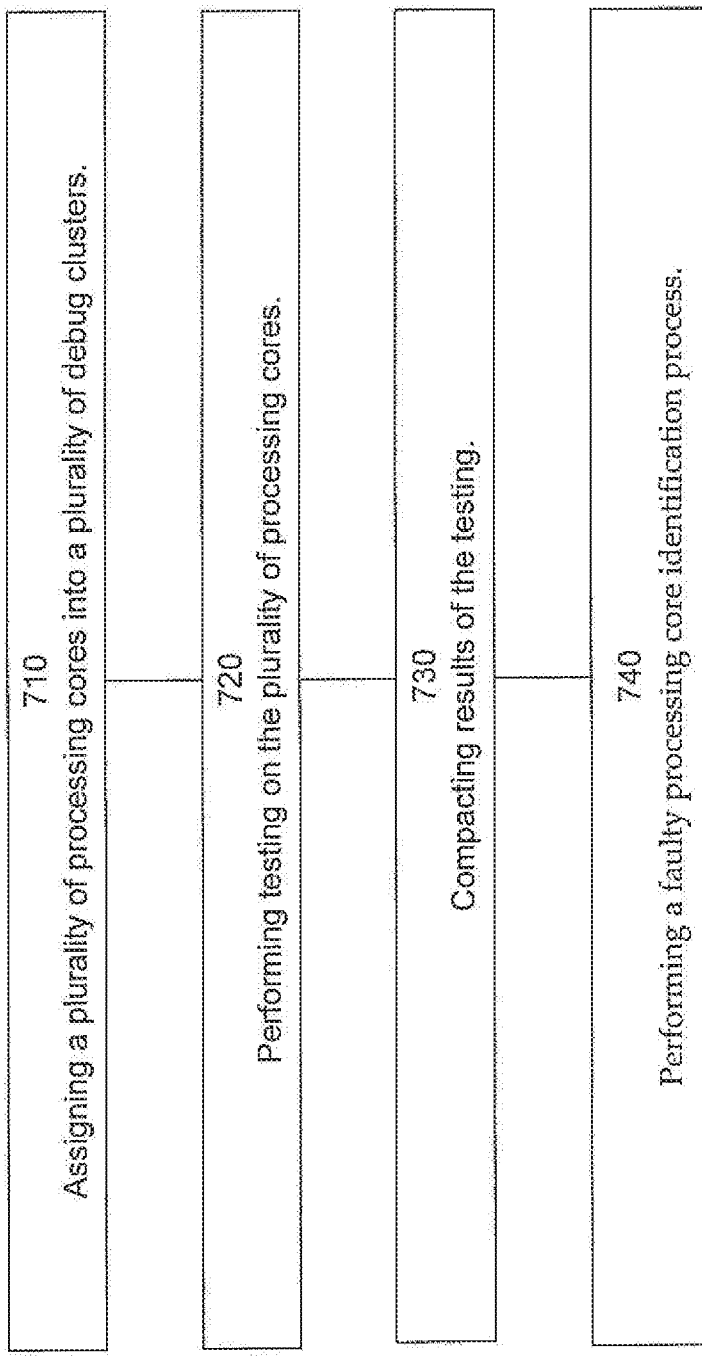
FIG. 7A is a flow chart of a debugging process in accordance with one embodiment.

FIG. 7 is a flow chart of a debugging process 700 in accordance with one embodiment.

In block 710, a plurality of processing cores are assigned into a plurality of debug clusters. In one embodiment, the processing cores are organized in levels comprising clusters, and wherein the number of processing cores in a cluster differs at different levels. The different levels can correspond to a debug hierarchy. In one embodiment, a set comprising at least one of the plurality of processing cores (or clusters from another level) is considered a cluster. In one exemplary implementation, a set comprising more than one of the plurality of processing cores (or clusters from another level) and less than all of the processing cores (or clusters from another level) is considered a cluster. The number of processing cores (or clusters from another level) in a cluster can be flexibly configurable.

In block 720, testing on the plurality of processing cores is performed. The results can include fault indicators. If a processing core has an error or fails a test a fault indicator associated with the processing core is generated. The fault indicator can be a logical indication or value. In one embodiment, a logical 1 value indicates a processing core has a fault and a logical 0 value indicates a processing core does not have a fault. In another embodiment, a logical 0 value indicates a processing core has a fault and a logical 1 value indicates a processing core does not have a fault.

In block 730, results of the testing are compacted. The compaction can be performed on a debug cluster basis. In one embodiment, the compacting includes performing a comparison operation on respective test results from respective ones of the plurality of processing cores assigned to a respective one of the plurality of debug clusters. The comparison operation can include a performing a logical operation (e.g., XOR, OR, etc.).

In block 740, a faulty processing core identification process is performed. A respective one of the plurality of processing cores associated with faulty test result is identified. In one embodiment, the faulty processing core identification process is performed on an iterative or progressive debug cluster basis as the process works through levels of a debug hierarchy. In one exemplary implementation, a faulty processing core identification process includes a non-intuitive debugging process (e.g., a priority encoding process, a two dimensional core array debug process, etc.).

FIG. 7B is a flow chart of a non-intuitive debugging process 750 in accordance with one embodiment. Non-intuitive debugging process 750 can include a priority encoding process.

In step 751, a respective one of the plurality of processing cores is associated with a respective priority code.

In step 751, a fault indication is encoded with the respective priority code associated with the failing processing core.

In step 753, based on the respective priority code and the fault indication, a respective one of the plurality of processing cores associated with a fault is identified.

FIG. 7C is a flow chart of a non-intuitive debugging process 770 in accordance with one embodiment. Non-intuitive debugging process 770 can include a 2-D core array debug process.

In step 771, test results are gathered on a two dimensional basis corresponding to a debug cluster array configuration.

In step 772, a scan out operation is performed to output the results;

In step 773, a failing processing core is identified based upon a failing indication in the results from the debug flip flop components. The identifying can be based upon a failure or fault indication in a row and column associated with a two dimensional array configuration of cluster members (e.g., processing cores, clusters from another level, etc.).

In one embodiment, the fault indication is associated with a test cycle. Identifying the respective one of the plurality of cluster members that has a fault indication associated with the testing is performed on a test cycle basis.

The test results and identity of faulty ones of the plurality or processing cores can be communicated off chip. The test results can be communicated to test equipment to test the DUT. The test results can be a response to a test pattern or the data set used to test a DUT (e.g., automatic test pattern generation (ATPG), a process for software to generate test patterns, etc.).

Figure 8:
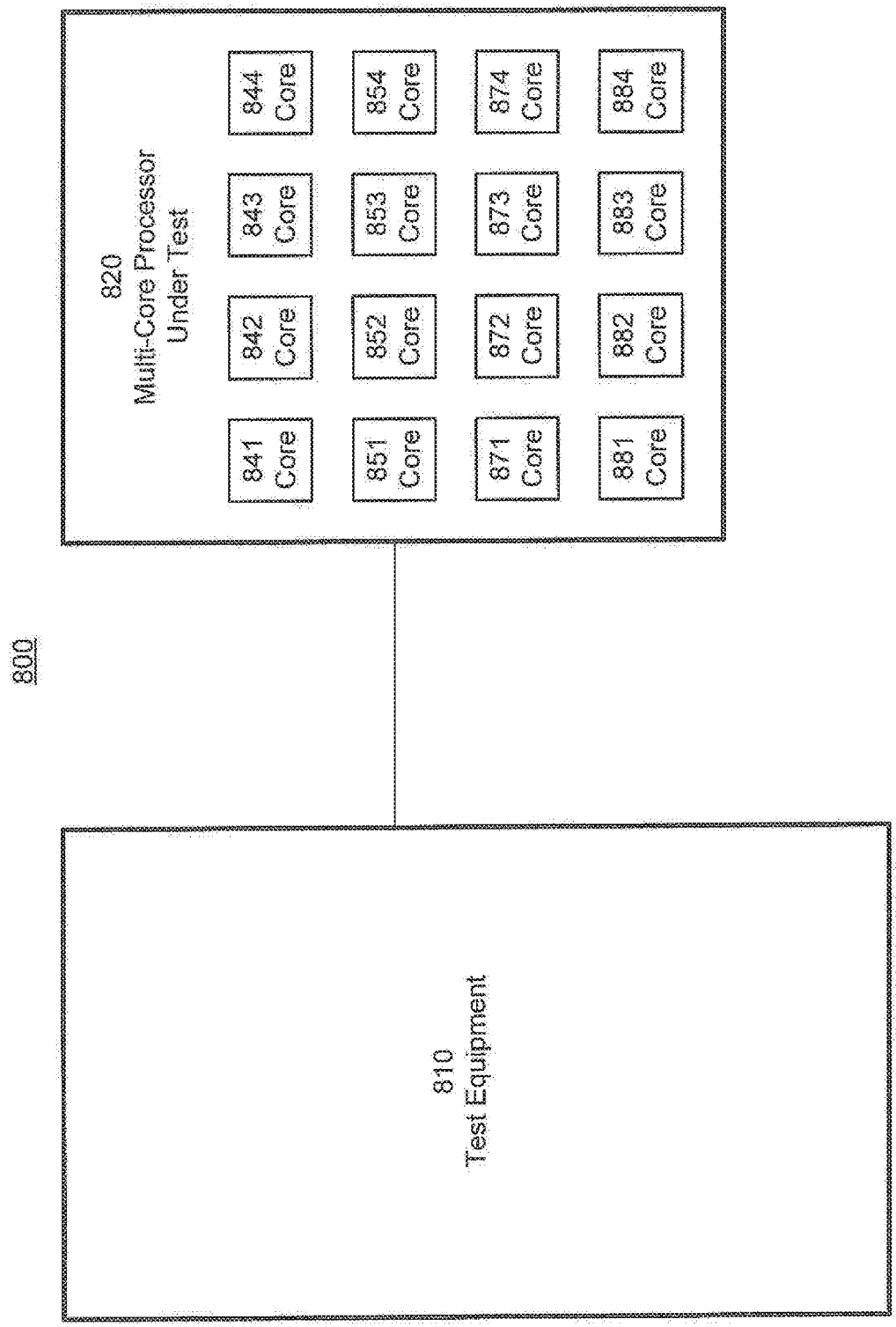
FIG. 8 is a block diagram of an exemplary test system in accordance with one embodiment.

FIG. 8 is a block diagram of an exemplary test system 800 in accordance with one embodiment. Test system 800 includes test equipment 810 and multi-core processor 820 under test. Multi-core processor 820 includes processing cores 841 through 884. Test equipment 810 can generate a test input pattern that is fed into multi core processor 820 which performs operational functions based upon the input. The test results are compacted and forwarded back to test equipment 820. Multi core processor can also perform debug operations based upon the results of the test. In one embodiment, if the test results indicate a fault, the debug operations include identifying a core corresponding to the fault.

Thus, presented test and debug systems and methods are efficient and effective. They offer flexible debuggability at various levels of granularity in a scalable and low cost manner. It can identify a failing core or group of cores for yield improvement.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A system comprising:
   a plurality of processing cores configured to process information, wherein the plurality of processing cores are configured to perform respective test operations within respective ones of the plurality of processing cores, wherein the plurality of processing cores are organized in a hierarchy of debug clusters;

a test result compaction component configured to compact results of the respective test operations from a portion of the plurality of processing cores, wherein a compacted indication of a passing test result and failed test result are available at a debug cluster basis, wherein the test result compaction component comprises logic gates; and a non-intuitive debug component coupled to the test result compaction component, wherein the non-intuitive debug component is configured to resolve the failed test result available at the debug cluster basis by identifying a member within a debug cluster that is associated with a respective one of the plurality of processing cores that has a fault, wherein the non-intuitive debug component comprises logic gates, wherein respective ones of the plurality of processing cores that are identified as having a fault are adjusted to mitigate impacts associated with the fault, wherein tests results of the respective members within a respective debug cluster are logically ORed together and the output of the logical ORing indicates whether or not members in the respective debug cluster pass the test.

2. The system of claim 1, wherein a set comprising more than one of the plurality of processing cores and less than all of the processing cores is considered a debug cluster.

3. The system of claim 1, wherein the hierarchy of debug clusters are organized in levels, wherein the number of processing cores in a debug cluster differs at different levels.

4. The method of claim 3, wherein a respective debug cluster at a particular level includes members, wherein the different levels correspond to a debug hierarchy.

5. The system of claim 1, wherein tests results of the respective plurality of processing cores within a respective debug cluster are logically XORed together and the output of the logical XOR indicates whether or not the plurality of processing cores in the respective debug cluster pass the test.

6. The system of claim 1, wherein output from a plurality of processing cores in a respective debug cluster are logically XORed together in one level of debug hierarchy and output from a respective plurality of debug clusters are logically ORed in another level of debug hierarchy.

7. The system of claim 1, wherein tests results of members in the respective debug cluster are fed into respective priority encoders on a progressive basis through a debug hierarchy, wherein the priority encoders are configured to identify a particular member within the debug cluster with a fault indication.

8. The system of claim 1, wherein tests results of the plurality of members in respective debug cluster are fed into a two dimensional core array debug infrastructure on a progressive basis through a debug hierarchy, wherein the two dimensional core array debug infrastructure is configured to identify a particular member within the debug cluster with a fault indication.

9. The system of claim 1, wherein the member is one of the plurality of processing cores.

10. The system of claim 1, wherein the member is a core sub-cluster from another debug hierarchy level, wherein the sub-cluster comprises multiple ones of the plurality of processing cores.

11. A method comprising:

assigning a plurality of processing cores into a plurality of debug clusters, wherein the plurality of processing cores are substantially the same;

performing testing on the plurality of processing cores;

compacting results of the testing, including performing a comparison operation on respective test results from respective ones of the plurality of processing cores assigned to a respective one of the plurality of debug clusters; and performing a non-intuitive faulty processing core identification process, including identifying a respective one of the plurality of processing cores that has a fault indication associated with the testing, wherein a respective cluster member is assigned a respective value and a correspondence is established between the respective value and a respective priority, wherein respective ones of the plurality of processing cores that are identified as having a fault are adjusted to mitigate impacts associated with the fault, wherein the respective tests results of the respective members within a respective debug cluster are logically ORed together and the output of the logical ORing indicates whether or not members in the respective debug cluster pass the test.

12. The method of claim 11, wherein the processing cores are organized in levels comprising debug clusters, and wherein the number of processing cores in a debug cluster differs at different levels, and the different levels correspond to a debug hierarchy.

13. The method of claim 11, wherein the identifying a respective one of the plurality of processing cores that has a fault indication associated with the testing includes a priority encoding process comprising:

associating respective ones of the plurality of processing cores with a respective priority code;

encoding the fault indication with the respective priority code associated with one of the plurality of processing cores that has a fault; and identifying, based on the respective priority code and the fault indication, a respective one of the plurality of processing cores associated with a fault.

14. The method of claim 11, wherein the identifying a respective one of the plurality of processing cores that has a fault indication associated with the testing includes a two dimensional core array debug process comprising: gathering the respective test results on a two dimensional basis corresponding to a debug cluster array configuration;

performing a scan out operation to output the respective test results; and identifying one of the plurality of processing cores that has a fault based upon a failing indication in the respective test results from debug flip flop components.

15. The method of claim 14, wherein the identifying is based upon a failure indication in a row and column associated with a two dimensional array configuration of the processing cores.

16. The method of claim 11, wherein a number of the processing cores in a respective one of the plurality of debug clusters is flexibly configurable.

17. The method of claim 16, where in output from a plurality of processing cores in a respective debug cluster are logically XORed together in one level of debug hierarchy and output from a respective plurality of debug clusters are logically ORed in another level of debug hierarchy.

18. The method of claim 11, wherein the comparison operation includes a performing a logical XOR.

19. The method of claim 11, wherein the fault indication is associated with a test cycle.

20. The method of claim 11, wherein the identifying the respective one of the plurality of processing cores that has a fault indication associated with the testing is performed on a test cycle basis.

21. The method of claim 11, wherein the test results and identity of faulty ones of the plurality or processing cores are communicated off chip.

\* \* \* \* \*